Oct. 3, 1967 C. W. FAILOR 3,345,512

AUDIO FREQUENCY OVERLAY DETECTOR TRACK CIRCUIT FOR ELECTRIC PROPULSION TERRITORY

Filed May 6, 1965 2 Sheets-Sheet 2

INVENTOR.
Charles W. Failor.
BY
W. L. Stout
HIS ATTORNEY

United States Patent Office 3,345,512
Patented Oct. 3, 1967

3,345,512

AUDIO FREQUENCY OVERLAY DETECTOR TRACK CIRCUIT FOR ELECTRIC PROPULSION TERRITORY

Charles W. Failor, Forest Hills, Pa., assignor to Westinghouse Air Brake Company, Swissvale, Pa., a corporation of Pennsylvania Filed May 6, 1965, Ser. No. 453,741
3 Claims. (Cl. 246—37)

Figure 1:
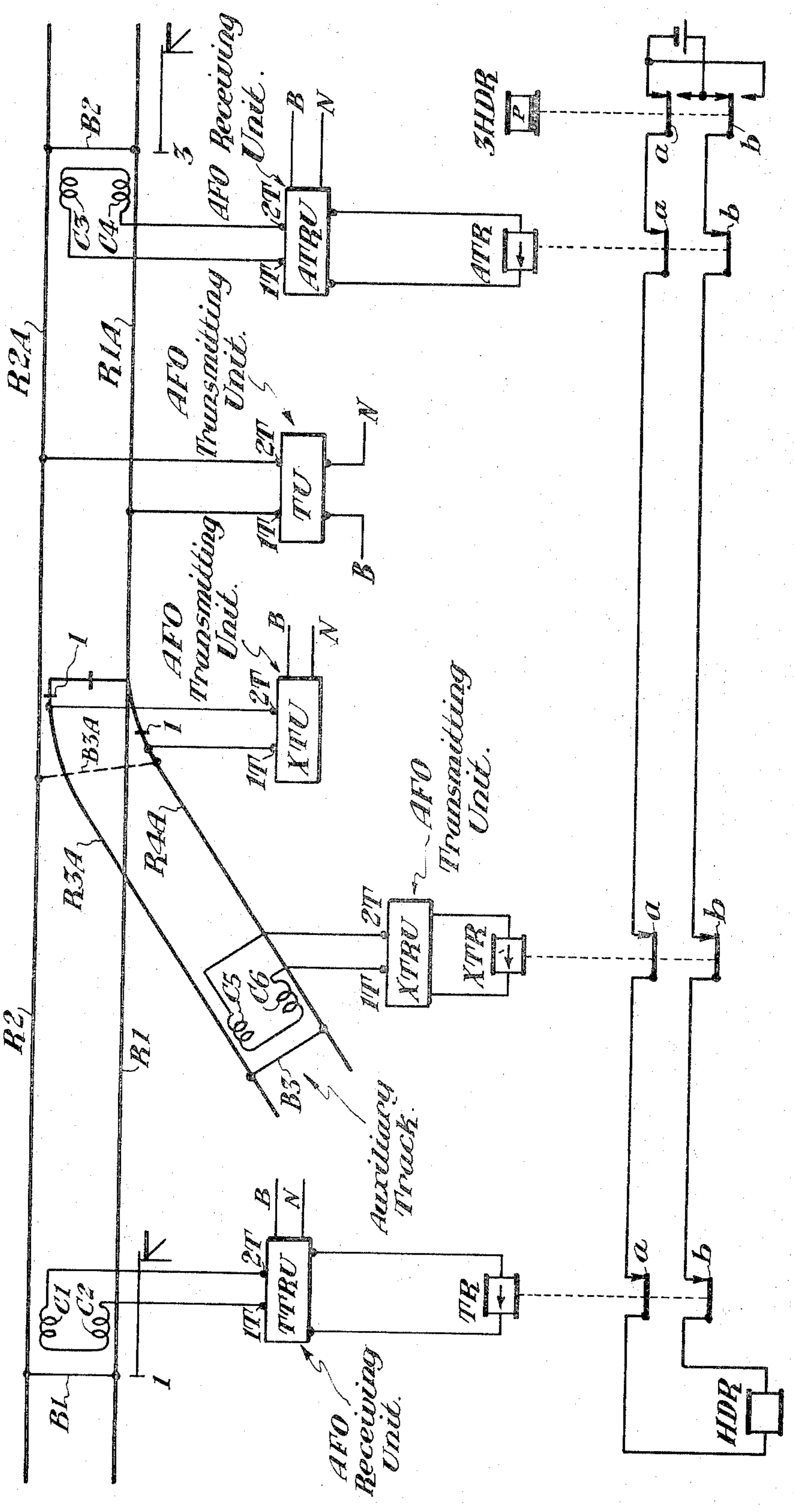

This invention relates to a track circuit system that utilizes audio frequency currents supplied to the rails to provide an indication of track occupancy over a predetermined section of track.

More specifically this invention relates to a track circuit system wherein there is present a balanced, continuous rail path for the propulsion return current in electrified territory, this being accomplished by an arrangement that is equivalent to the use of impedance bonds in conventional track circuits. The invention provides positive shunting points for operating the signaling system. The circuit system to be described also contemplates a number of novel circuit arrangements for coupling track relays to the rails in combination with a center fed audio frequency overlay track circuit.

The prior art has recognized the usefulness of audio frequency circuits to control signaling at rail crossings but there has not been an active interest in utilizing audio frequency circuits to function purely as a track occupancy signaling system.

It is therefore an object of this invention to provide track occupancy signaling by the utilization of an audio frequency circuit.

Another object of this invention is the provision of a balanced, continuous rail path for return propulsion current, which rail path incorporates the simultaneous employment of an audio frequency circuit to provide an indication of track occupancy.

Yet another object of this invention is the provision of an audio frequency overlay signaling system that has immunity from electric propulsion frequencies, commercial frequencies, harmonics and beat frequencies, all of which tend to hamper efficient signaling.

In the attainment of the foregoing objects there is utilized a limiting crossbond at each end of each track circuit to confine the track circuit and to equalize the electric propulsion energy in the two running rails, these rails being electrically continuous and not incorporating any insulated joints. An audio frequency transmitter is connected directly to the rails at a mid point in the center fed track circuit. An audio frequency receiver tuned to the frequency of the audio frequency transmitter output is located at each end of the center fed track circuit. In one embodiment of the invention each audio frequency receiver is inductively connected to the running rails to receive the transmitted audio frequency signal and thereby maintain a track relay energized, the energized relay maintaining a signal indicative of the unoccupied rail section incorporating the track circuit of the invention. Upon the entrance of a train within the rail section containing the track circuit, the wheels and axles of the train will shunt the rails, thereby deenergizing the circuit containing the audio frequency receiver which results in the deenergization of the track relay. This deenergization of the track relay results in a signal indication that the track is occupied.

A second embodiment of this invention makes use of audio frequency receiver units connected across the running rails at each end of the rail circuit, each receiver being energized by the voltage drop produced by the impedance of the bonds connecting the running rails together. The presence of a train within the track section produces the same shunting action previously described with the concomitant track occupancy signal being made evident.

Figure 2:
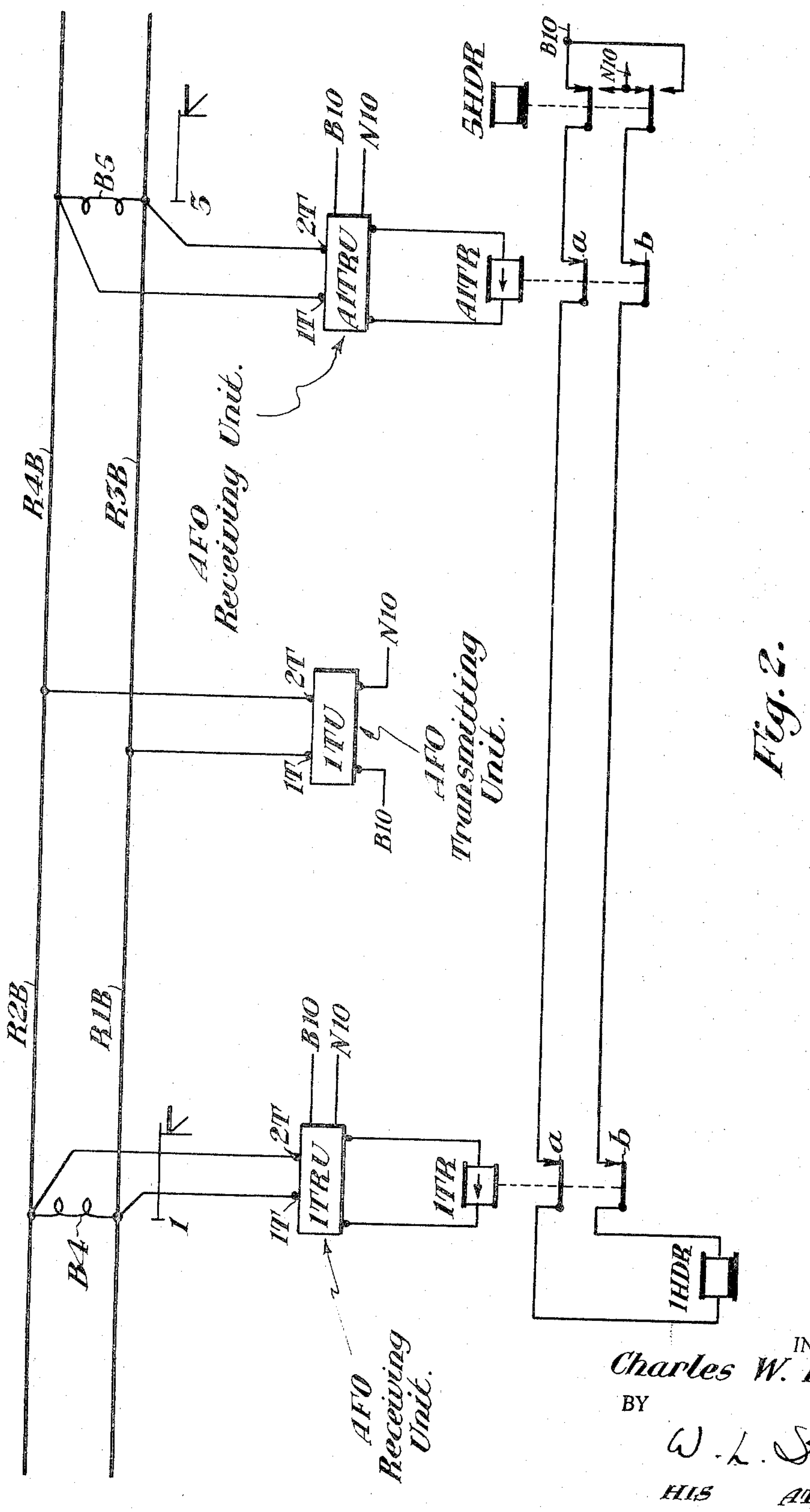

Other objects and advantages of the present invention will become apparent from the ensuing description of illustrative embodiments thereof, in the course of which reference is had to the accompanying drawings, in which:

FIG. 1 illustrates one circuit arrangement of one embodiment of the invention, and FIG. 2 depicts a second circuit arrangement of a second embodiment of the invention.

A description of the above embodiments will follow and then the novel features of the invention will be presented in the appended claims.

Reference is now made to FIG. 1 in which there is illustrated a typical track circuit embodying the invention. In this figure there is supplied at a point midway between signals 1 and 3 an audio frequency transmitting unit TU which has electrical leads coming from terminals 1T and 2T of the transmitting unit TU. The transmitting unit TU is energized from a suitable source of current, the positive and negative terminals of which are designated B and N. There are two electrical leads leading from the audio frequency transmitting unit TU to the rails of the track to be controlled. The rails to the right of the point at which the audio frequency transmitting unit is connected are designated R1A and R2A, respectively, and the track to the left in this figure is designated R1–R2. Both of these track sections R1, R2 and R1A, R2A form integral parts of the track circuit. This particular circuit configuration makes use of an inductively coupled arrangement. To the left of the transmitter TU there will be seen rail bond B1 which interconnects rails R1 and R2. This rail bond functions to define the limits of the track circuit and also acts to balance the electric propulsion current present within the rails R1 and R2 where electrified operation is in use. This bond B1 maintains, as has been noted, the balance between the rails R1 and R2. In this particular instance, the transmitting unit TU is transmitting at a 1 kilocycle rate which has been selected for purposes of explanation only.

The first track circuit to be discussed includes the audio frequency transmitting unit TU, this circuit starting with terminal 1T through unit TU to terminal 2T, and thence to the rail R2, the rail bond B1 and back over the rail R1 to the point 1T of the transmitting unit TU. Energy is constantly being delivered by the transmitting unit TU to the rail sections. At the left-hand end of the rail section defined by rails R1 and R2 and bond B1, is an arrangement of coils C1 and C2 that are positioned adjacent the rails to inductively pick up the audio frequency signal being transmitted to the rails by the transmitting unit TU. These inductive coils C1 and C2 are respectively connected through the terminals 1T and 2T of the audio frequency receiving unit TTRU in a series circuit.

As long as the audio frequency transmitting unit TU is producing a signal, a circuit is being completed via the inductive coupling of the coils C1 and C2 with the rails R2 and R1. The amplifier of the audio frequency receiving unit TTRU is supplied with direct current energy from terminals B and N. This audio frequency receiving unit in turn maintains track relay TR shown directly beneath the audio frequency receiving unit TTRU in an energized state. While in this energized state the track relay TR keeps the contacts *a* and *b* in a closed position, thereby maintaining the home distance signal relay HDR in an energized condition to thereby maintain a signal at signal location 1 in a condition indicative of the fact that there is no train present on the rails R2 and R1 between the rail bond B1 and the point at which the audio frequency transmitting unit TU is located. While this figure sets forth schematically an arrangement in which the audio frequency transmitting unit appears not to be centrally located between rail bonds B1 and B2, i.e., the nominal ends of the track section, this figure is intended to convey the generalized situation where the audio frequency transmitting unit TU is located approximately midway between signal locations 1 and 3. For purposes of illustration the audio frequency transmitting unit has been located more nearly adjacent the third station 3 and the rail bond B2. It should be understood in practice, as has been noted, that normally this audio frequency transmitting unit is located at a point generally midway between the two stations to be controlled.

It should be understood that the arrangement illustrated is wholly operable and there are instances where the use of audio frequency transmitters with or without variable output can be employed in conjunction with audio frequency receivers with or without automatic gain. Upon the suitable adjustment of transmitters and receivers a variety of arrangements is possible.

A second track circuit which utilizes the audio frequency transmitting unit TU incorporates as an integral part of this circuit the rails R1A and R2A and forms a complete circuit through the transmitting unit TU via the terminal 1T to the rail R1A, thence through the rail bond B2, and back along the rail R2A, and thence through the electrical connection to the terminal 2T of the audio frequency transmitting unit. It can therefore be seen that this provides a basic complete circuit. Immediately adjacent the rails R2A and R1A in the vicinity of the rail bond B2 and the signal station 3, there are located coils C3 and C4 mounted in an inductive relationship to the rails R2A and R1A, respectively. The leads from these coils C3 and C4 are led directly to the terminals 1T and 2T of the audio frequency receiving unit ATRU, which audio frequency receiving unit has a power supply from terminals B and N. As long as there appears in the rails R2A and R1A the audio frequency current from unit TU of 1 kilocycle, there will appear in the inductive coils C3 and C4 a current indicative of the audio frequency being transmitted. This in turn will maintain the audio frequency receiving unit ATRU in an actuated state, thereby keeping the track relay ATR in an energized condition with its contacts *a* and *b* in a closed position. Accordingly, it is seen that two distinct circuit arrangements are present which employ commonly the use of an audio frequency transmitting unit TU. This arrangement is designated a center fed audio frequency track circuit arrangement and the manner in which these two circuits operate will now be described.

As a train appears to the left in this figure, passing from left to right, the train wheels will pass over the rail bond B1 and past the coils C1 and C2 of the first circuit described, and in so doing the train will shunt the rails R1 and R2, thereby deenergizing the circuit which controls the audio frequency receiving unit TTRU. As soon as this occurs no further energy will appear in the coils C1 and C2 because of the shunting action of the train wheels across the track rails R1 and R2. Therefore, the audio frequency receiving unit TTRU will be deenergized and the track relay TR in turn will be deenergized, opening its contacts *a* and *b*, thereby causing the home distant signal relay HDR to actuate an indication at signal location 1 indicative of the fact that there is a train present in the rail sections which include the rails R1, R2 and R1A, R2A. As the train passes from left to right in this figure along the rails R1 and R2 and thence into the sections of rail designated R1A and R2A, there will be a continued shunting action across the rails and once the train has entered the rail section R1A–R2A, the circuit which includes the coils C3 and C4 will be deenergized by the shunting action across the rails, and the coils C3 and C4 will cease to have present therein an inductively induced signal representative of the 1 kilocycle audio frequency current that has been placed on the rails R2A–R1A. This, of course, results in the deenergization of the audio frequency receiving unit ATRU which deenergizes the track relay ATR to open its contacts *a* and *b*, which will continue the signal relay HDR in its deenergized condition. This in turn maintains the signal at location 1 to indicate the presence of a train in the rail section R1A–R2A.

It goes without saying that should a train appear to the right of the rail bond B2 and the rails R2A–R1A, moving from right to left in this figure, the reverse circuit interaction described with reference to a train passing from left to right would occur and the signal indication at location 1 would be representative of track occupancy in the rail sections R2A–R1A and R1–R2 as the train moved from right to left.

This figure also includes an auxiliary track section and the manner in which this particular audio frequency circuit may be utilized to prevent the fouling of the main track by a train on the auxiliary track R3A–R4A. As a train approaches the auxiliary track section which includes the rails R3A–R4A, it will pass over the rail bond B3, which rail bond functions in precisely the same manner as the rail bonds B1 and B2 previously described. There is also located adjacent the rails R3A–R4A inductive coils C5 and C6 which receive inductively a signal from the audio frequency transmitting unit XTU which is operating, for example, at a 1.5-kilocycle rate. This 1.5-kilocycle rate has been selected in order that the audio frequency receiving units TTRU and ATRU, which have been tuned to the 1 kilocycle rate, will not be actuated or in any way activated by the presence of the 1.5 kilocycle audio frequency current that has been applied to the auxiliary track R3A–R4A. This auxiliary track section is supplied from the terminals 1T–2T of the audio frequency transmitting unit XTU. The track circuit is completed through terminal 2T of the audio frequency transmitting unit XTU to the rail R3A, thence to the bond B3, thence to the rail R4A, and back to the terminal 1T of he transmitting unit XTU. The points of the switch shown in the drawing are insulated from the rails of the main track by the customary insulated joints. As long as no train appears in this rail section R3A–R4A, the audio frequency receiving unit XTRU will be in an energized state and its associated track relay XTR will also be energized to maintain a signal at the point where the auxiliary track enters the main rail line indicative of the absence of a train within the section of track R3A–R4A.

As a train approaches the rail bond B3 from left to right, and then passes over the rail bond B3, the circuit incorporating the coils C5 and C6 will be deenergized to thereby produce a deenergized condition in the audio frequency receiving unit XTRU, and therefore the deenergization of the track relay XTR will occur and a signal will appear indicative of the fact that a train in the track section R3A–R4A has entered or has fouled the main track section of rails R1–R2.

While the embodiment of the invention just described with reference to the auxiliary track calls for a separate audio frequency transmitter XTU operating with a frequency of 1.5 kilocycles, the invention also contemplates the provision of the substitution of an audio frequency receiver tuned to the 1.0-kilocycle output of the audio frequency transmitter TU, for the audio frequency receiver XTRU. In this embodiment which is not illustrated there would not then be the need for the 1.5-kilocycle audio frequency transmitter XTU, but there would be required a rail bond B3A shown dotted in FIG. 1. This rail bond B3A would electrically interconnect the rail R4A to the rail R2. This just described embodiment is wholly compatible with the system described heretofore when certain parameters are considered.

When the distance from the rail bond B1 to the transmitter TU is greater than the distance from the rail bond B3 to the transmitter TU the impedance loss due to the impedance of the rails seen at the rail bond B1 is greater than that seen at the rail bond B3. Therefore, the substituted 1.0-kilocycle receiver in the auxiliary section of track remains energized even though a train may have just shunted the rails at the rail bond B1. This will therefore allow a train entering the auxiliary track section to shunt the rails R3A, R4A and deenergize the substituted 1.0-kilocycle receiver and related relay to open contacts in the conventional wayside polarized circuit to thereby establish an indication that a train is about to enter the main section of track.

Reference is now made to FIG. 2 in which there is illustrated the second embodiment which may be utilized to incorporate the broad inventive concept present here. In this figure there is a center fed arrangement similar to that shown in FIG. 1. In this instance a first section of rail is defined by the rails R1B–R2B and a second section of rail is defined as R3B–R4B. The audio frequency transmitting unit 1TU forms a complete circuit with the rail bond B4. The rail bond B4 may be of the type shown in the copending application for Letters Patent of the United States, Ser. No. 382,551, filed July 14, 1964, by Ralph Popp, for Electric Induction Apparatus, now Patent No. 3,268,843, granted Aug. 23, 1966. The rail bond B4 interconnects the rails R2B and R1B, this rail bond maintaining a balance of propulsion return current between the respective rails and provides a high impedance to the 1 kilocycle signals placed on the rails by the audio frequency transmitting unit 1TU.

There has been in this instance the incorporation of a different means for maintaining the audio frequency receiving units in an actuated condition. In FIG. 1, inductive pickups were utilized to maintain the audio receiving units in an energized condition. In this embodiment, that is, the embodiment of FIG. 2, there is utilized the voltage drop over the impedance of the bond between the rails, for example, R1B and R2B. The output terminals 1T and 2T of the audio receiving unit 1TRU are connected in parallel across the rail bond B4. The receiver 1TRU is then energized by the voltage drop produced by the bond connecting the rails together. In this instance since it can be seen that there are two audio frequency receiving units 1TRU and A1TRU, there will be two distinct track circuits each relying on the voltage drop across their respective rail bonds to maintain their respective track relay 1TR of the audio frequency receiving unit 1TRU and the track relay A1TR of the audio frequency receiving unit A1TRU in an energized condition. This will maintain the wayside signal at location 1 indicative of the track occupancy under the conditions depicted and just described. These circuits function in a manner similar to that set forth in FIG. 1.

As a train approaches from left to right along the rails and past the rail bond B4 and enters the track section R1B–R2B, the wheels of the train shunt the rails R1B–R2B and thereby deenergize the audio frequency receiving unit 1TRU. This results in a deenergization of the track relay 1TR, opening its contacts *a* and *b* and producing a signal at signal station 1 which indicates that the track sections R2B–R1B and R4B–R3B have a train disposed thereon. In a similar manner, as the train proceeds from right to left and enters the section of track R3B–R4B, the rails are shunted and in so being shunted deenergize the audio frequency receiving unit A1TRU. The audio frequency receiving unit A1TRU is of a similar construction to the earlier described audio frequency receiving units depicted in FIG. 1. Each of these audio frequency receiving units has terminals 1T and 2T and are supplied with battery voltage at a 10-volt rate from terminals B10 and N10. The selection of the 10-volt rate is meant only to be exemplary and not limiting. The audio frequency receiving unit A1TRU in turn is interconnected by electrical leads to track relay A1TR, which relay, when in an energized condition, maintains its contacts *a* and *b* in a closed position thereby providing an indication at the signal location 1 of the absence of a train within the track rail sections R3B–R4B and R1B–R2B.

In this FIG. 2 it can be seen that home distance relay 4HDR receives its energy from terminals B10–N10 depicted in the right-hand portion of this figure. This conventional wayside polarized circuit is utilized to provide a continuous reflection of track occupancy as trains pass along the track. Relay 5HDR will be controlled in a manner similar to relay 4HDR.

Therefore, in summation, a train present within the section of track R3B–R4B will result in the shunting of both rails and the interruption of the current to the audio frequency receiving unit A1TRU, thereby producing a deenergization of the track relay A1TR with the concomitant opening of its contacts *a* and *b* which produces a signal indication in the conventional manner at signal location 1 indicative of the fact that track sections R3B–R4B and R1B–R2B are then being occupied by a train shunting the rails. As the train passes from left to right, the rail section R1B–R2B would be shunted and there would be an interruption of the current through the audio frequency receiving unit 1TRU which would result in the deenergization of the track relay 1TR, producing an open condition of the contacts *a* and *b* of the track relay 1TR which would result in a signal at signal location 1 that a train has begun to occupy the rail sections R1B–R2B and R3B–R4B.

It is therefore seen that there are two distinct approaches for utilizing the center fed audio frequency overlay circuitry that has been described. In the first instance, coils inductively picked up the transmitted signal, in this case 1 kilocycle, and in the second instance the audio frequency receiving units are maintained in energized conditions as a result of a voltage drop across the bonds B4 and B5, and these circuits, respectively, were maintained in an energized condition from the center fed audio frequency transmitting units TU and 1TU.

In each of the embodiments, that is FIG. 1 and FIG. 2, the audio frequency receiving units have been tuned to the output of the audio frequency transmitting unit which is center fed to the track rails. The fact that these audio frequency receiving units 1TRU and A1TRU are tuned in these particular instances to the audio frequency transmitting unit is essential to the invention. It can be seen that additional audio frequencies may be applied to adjacent sections of rail and it is important to the invention that these frequencies not in any way interfere with or affect the audio frequency receiving units initially described. The frequencies utilized of course must be staggered and arranged in a series that would avoid possible cross interference. Typical frequencies that might be employed could be 1.5 kilycycles, 2 kilocycles, or even 3 kilocycles. These different rates will produce versatility of operation in their respective sections without affecting whatsoever the track circuit that incorporates the audio frequency transmitting unit operating at the 1-kilocycle rate. Since each of the audio frequency receiving units rejects all frequencies other than the one it is tuned for, it can be seen that this arrangement provides a system which is totally free from interference from conventional power sources that may be near the tracks, or which may produce in the tracks inductively frequencies of different magnitudes which might disturb the signaling process that takes place within the track circuits just described. Therefore, this arrangement has an immunity to spurious signals that may appear on the track rails, and also because of the range of audio frequencies available this system may utilize staggered frequencies along the rail system to produce a continuous check of track occupancy and the production of signals along the wayside which reflect the occupancy of the track at any particular instant.

It should be understood that while this system has been described in conjunction with a train having wheels that shunt the rails, the system also contemplates the employment of the invention where means other than the wheels of the train are used to shunt circuitry to provide wayside signaling. The situation would arise where pneumatic tired carriers are employed and the center fed audio frequency energy is fed to a conductor's position along the wayside of the carrier's direction of travel.

While the present invention has been illustrated and disclosed in connection with the details of illustrative embodiments thereof, it should be understood that those are not intended to be limitative of the invention as set forth in the accompanying claims.

Having thus described my invention, what I claim is:

1. A track overlay signaling system for use in electrified territory where there are present spurious electric propulsion and commercial power source frequency signals as well as harmonic and beat frequencies resulting from the presence of said spurious frequency signal sources, said spurious frequency signal sources appearing in a pair of electrically continuous rails which rails carry a train having wheels thereon, said rails providing a propulsion current return path, (a) a signal source of audio frequency energy fed to said rails at a first point, (b) said circuit system being defined by the presence of impedance bonds between said rails at two points remote from each other and on either side of said first point, said impedance bonds balancing the propulsion return current between said rails, said impedance bonds having a high impedance to the audio frequency energy, (c) audio frequency receivers electrically coupled to said rails at said impedance bond, each of said receivers energized by the voltage drop produced by said impedance bonds, said propulsion current balancing impedance bonds cooperating with said audio frequency energy signals to establish an overlay signaling system that has immunity from said spurious electric propulsion and commercial power source frequency signals as well as said harmonic and beat frequencies resulting from the presence of said spurious frequency signal sources, said current balancing impedance bonds and said signal source of audio frequency energy establishing a pair of complete overlay track circuits, (d) a track relay controlled by each audio frequency receiver and electrically interconnected to control an indication signal.

2. A track overlay signaling system of claim 1 wherein said overlay track circuit which includes said track relay and said signal source of audio frequency energy is electrically shunted by the presence of said train wheels across said rails to control said indication signal to indicate the presence of a train on said rails at a point intermediate said bonds.

3. The track overlay signaling system of claim 1 wherein said signal source of audio frequency operates at a fixed predetermined frequency and said audio frequency receivers are tuned to and respond only to said fixed predetermined frequency.

References Cited

UNITED STATES PATENTS

| | | | |
|---|---|---|---|
| 1,094,894 | 4/1914 | Hawkins | 246—36 |
| 1,324,912 | 12/1919 | Lewis | 246—36 |
| 2,930,888 | 3/1960 | Crawford et al. | 246—34 XR |
| 2,993,116 | 7/1961 | Utt | 246—36 XR |
| 3,035,167 | 5/1962 | Luft | 246—130 |
| 3,046,392 | 7/1962 | Luft | 246—130 |
| 3,069,542 | 12/1962 | Failor | 246—34 XR |
| 3,267,281 | 8/1966 | Buck | 246—130 XR |

ARTHUR L. LA PONT, *Primary Examiner.*

STANLEY T. KRAWCZEWICZ, *Examiner.*